(12) United States Patent
Liu et al.

(10) Patent No.: US 9,076,220 B2
(45) Date of Patent: Jul. 7, 2015

(54) METHOD OF PROCESSING AN IMAGE BASED ON THE DETERMINATION OF BLOCKINESS LEVEL

(75) Inventors: Debing Liu, Beijing (CN); Zhibo Chen, Beijing (CN); Xiaodong Gu, Beijing (CN); Feng Xu, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 136 days.

(21) Appl. No.: 13/642,622

(22) PCT Filed: Apr. 29, 2010

(86) PCT No.: PCT/CN2010/000592
§ 371 (c)(1),
(2), (4) Date: Oct. 22, 2012

(87) PCT Pub. No.: WO2011/134105
PCT Pub. Date: Nov. 3, 2011

(65) Prior Publication Data
US 2013/0039420 A1  Feb. 14, 2013

(51) Int. Cl.
*G06K 9/34* (2006.01)
*G06T 7/00* (2006.01)
*G06T 7/40* (2006.01)
*H04N 19/159* (2014.01)
*H04N 19/176* (2014.01)
*H04N 19/117* (2014.01)
*H04N 19/86* (2014.01)

(52) U.S. Cl.
CPC ............. *G06T 7/0081* (2013.01); *G06T 7/0002* (2013.01); *G06T 7/401* (2013.01); *G06T 2207/20021* (2013.01); *G06T 2207/30168* (2013.01); *G06T 2207/20136* (2013.01); *H04N 19/159* (2014.11); *H04N 19/176* (2014.11); *H04N 19/117* (2014.11); *H04N 19/86* (2014.11); *H04N 19/865* (2014.11)

(58) Field of Classification Search
None
See application file for complete search history.

(56) References Cited

U.S. PATENT DOCUMENTS 6,417,861 B1 * 7/2002 Deering et al. ............... 345/589
6,577,745 B1   6/2003 De Beeck et al.
(Continued)

FOREIGN PATENT DOCUMENTS

| CN | 1742281 | 3/2006 |
|----|---------|--------|
| CN | 101605257 | 12/2009 |

(Continued)

OTHER PUBLICATIONS

Search Rept:Feb. 10, 2011.
(Continued)

*Primary Examiner* — Bhavesh Mehta
*Assistant Examiner* — Feng Niu
(74) *Attorney, Agent, or Firm* — Myers Wolin LLC (57) ABSTRACT

A method for processing an image divided into blocks of pixels is described. The method includes detecting a largest sub-block whose pixels have an equal luminance value and identifying if the detected largest sub-block is or is not a natural texture. Thereafter, a weighted luminance difference is calculated between the detected largest sub-block and neighboring pixels and a block blockiness level is determined on the basis of the number of pixels within the detected largest sub-block, of the identification step and of the weighted luminance difference. The image is then processed on the basis of the block blockiness level.

16 Claims, 5 Drawing Sheets

(56) References Cited

U.S. PATENT DOCUMENTS

| | | |
|---|---|---|
| 6,922,492 B2 | 7/2005 | Yu et al. |
| 7,310,428 B2 | 12/2007 | Anzai et al. |
| 7,412,151 B1 | 8/2008 | Kalker et al. |
| 7,596,221 B2 | 9/2009 | Langelaar |
| 2004/0125952 A1 | 7/2004 | Alattar et al. |
| 2004/0126034 A1 | 7/2004 | Yu et al. |
| 2008/0143739 A1 | 6/2008 | Harris et al. |
| 2008/0247597 A1 | 10/2008 | Isogai |
| 2008/0266427 A1 | 10/2008 | Ferguson et al. |
| 2009/0220152 A1* | 9/2009 | Tiwari et al. .................. 382/173 |
| 2010/0033633 A1* | 2/2010 | Dane et al. .................... 348/625 |

FOREIGN PATENT DOCUMENTS

| | | |
|---|---|---|
| CN | 101682767 | 3/2010 |
| WO | WO-03034335 | 4/2003 |
| WO | WO2005122586 | 12/2005 |
| WO | WO-2008085425 | 7/2008 |
| WO | WO-2008124744 | 10/2008 |
| WO | WO2010021691 | 2/2010 |
| WO | WO2010021700 | 2/2010 |
| WO | WO2011097752 | 8/2011 |

OTHER PUBLICATIONS

Leontaris et al: "Comparison of blocking and blurring metrics for video compression" IEEE Mar. 18-23, 2005 pp. 585-588.

Leontaris et al:"Quaiity evaluation of motion compensated edge artifacts in compressed video" IEEE, vol. 16 No. 401 Apr. 2007 pp. 943-956.

Perra et al."Image blockiness Evaluation based on sobel operator" Image Processing 2005ICIP IEEEvol. 1 Sep. 11, 2005 pp. 389-392.

Wu et al.;"A generalized block edge impairment metric for video coding" IEEE, vol. 4 No. 11; Nov. 11, 1997.

Suthaharan: "Perceptual quality metric for digital video coding", IEEE vol. 39, No. 5, pp. 431-433, Jan. 28, 2003.

Gao et "A De-Blocking Algorithm and a Blockiness Metric for Highly Compressed Images", IEEE vol, 12, No. 12. p. 1150-1159, Dec. 2002.

Girod "The Information Theoretical Significance of Spatial and Temporal masking in Video Signals", SPIE vol. 1077, p. 178-187, Jan. 1989.

Yuen et al "A Survey of hybrid MC/DPCM/DCT video coding distortions", Signal Processing, vol. 70. pp. 247-278, Oct. 1998.

Zhai et al: "No-reference noticeable blockiness estimation in images" IEEE Trans. On Signal Processing Image Communication, vol. 23, Issue 6, Jul. 2008, pp. 417-432.

\* cited by examiner

METHOD OF PROCESSING AN IMAGE BASED ON THE DETERMINATION OF BLOCKINESS LEVEL

This application claims the benefit, under 35 U.S.C. §365 of international Application PCT/CN2010/000592, filed Apr. 29, 2010, which was published in accordance with PCT Article 21(2) on Nov. 3, 2011 in English.

1. FIELD OF THE INVENTION

The invention relates to image processing. More precisely, the invention concerns a method for processing an image divided into blocks.

2. BACKGROUND OF THE INVENTION

Blockiness is one of the main artifacts in images encoded by block based codecs. Accurately determining the blockiness level of an image or of image blocks is necessary to evaluate the image quality and consequently helps the processing of the image. As an example, when filtering an image, a stronger filter is applied on blocks with high blockiness levels while lower or no filter is applied on the other blocks, i.e. those with low blockiness levels. Blockiness can be defined as the discontinuity at the boundaries of adjacent blocks in an image. Therefore, many known methods for determining a blockiness level operate at macroblocks' boundaries. These methods do not appropriately manage blockiness propagation. Indeed, due to motion compensation, blockiness artifacts are propagated from reference images into predicted images. Consequently, blockiness artifacts in the predicted images are not necessarily aligned with macroblock boundaries. In this case, known methods fail to determine an accurate blockiness level. In addition, such known methods do not accurately determine blockiness level when a deblocking filter is applied. Such a deblocking filter is for example used when encoding a video according to H.264 video coding standard. When a deblocking filter is applied, the discontinuity at the macroblock boundaries is decreased. In this case, known methods fail to determine accurate blockiness levels solely based on the difference at the boundaries. Finally, such known methods fail to accurately determine the blockiness level of images with large plain or complicated texture.

3. BRIEF SUMMARY OF THE INVENTION

The object of the invention is to overcome at least one of these drawbacks of the prior art.
To this aim the invention relates to a method for processing an image divided into blocks of pixels comprising the steps of:
  detecting, for each block, a largest sub-block whose pixels have an equal luminance value;
  identifying, for each block, if the detected largest sub-block is or is not a natural texture;
  calculating, for each block, a weighted luminance difference between the detected largest sub-block and neighboring pixels;
  determining, for each block, a block blockiness level on the basis of the number of pixels within the detected largest sub-block, of the identification step and of the weighted luminance difference; and
  processing the image on the basis of the block blockiness levels.
Advantageously, the method further comprises determining an image blockiness level for the image by averaging the block blockiness levels. In this case, the image is processed on the basis of the image blockiness level. According to an aspect of the invention, the processing step comprises one of the steps belonging to the set comprising:
  encoding step;
  filtering step; and
  distributing step.
According to a particular aspect of the invention, the identification step comprises, when a deblocking filter is applied on the image, identifying the detected largest sub-block as natural texture when the detected largest sub-block reaches at least two opposite block borders.
According to another aspect of the invention, the identification step comprises, when no deblocking filter is applied on the image or when no information is provided on if deblocking filter is applied or not, identifying the detected largest sub-block as natural texture when the detected largest sub-block exceeds at least two opposite block borders.
Advantageously, the step of determining a block blockiness level comprises the steps of:
  determining a preliminary block blockiness level on the basis of the number of pixels within the detected largest sub-block and on the basis of the results of the identification step; and
  adjusting the preliminary block blockiness level as a function of the weighted luminance difference, the function depending on a blockiness sensitivity.
According to a specific embodiment, the preliminary block blockiness level BBL for a block is calculated as follows:

$$BBL = \begin{cases} 0 & \text{when the detected largest subblock is natural texture} \\ 1 & \text{when } T2 \le N \\ N/T2 & \text{when } T1 \le N < T2 \\ 0 & \text{when } N < T1 \end{cases}$$

where T1 and T2 are threshold values and N is the number of pixels within the detected largest sub-block.
According to a variant, the preliminary block blockiness level BBL for a block is calculated as follows:

$$BBL = \begin{cases} 0 & \text{when the detected largest subblock is a natural texture} \\ 1 & \text{when } T2 \le N \\ 0.5 & \text{when } T1 \le N < T2 \\ 0 & \text{when } N < T1 \end{cases}$$

where T1 and T2 are threshold values and N is the number of pixels within the detected largest sub-block.

4. BRIEF DESCRIPTION OF THE DRAWINGS

Other features and advantages of the invention will appear with the following description of some of its embodiments, this description being made in connection with the drawings in which.

5. DETAILED DESCRIPTION OF THE INVENTION

The method of processing an image divided into blocks of pixels is described with reference to FIG. 1. According to a specific embodiment the blocks are macroblocks.

At step 10, the largest sub-block whose pixels have an equal luminance value is detected within the current block. As an example illustrated on FIG. 2, the largest sub-block is detected as follows:
- detecting the longest line of pixels with equal luminance value in every horizontal row of the current block and recording the start and end position of the longest line and the corresponding equal luminance value;
- comparing, for each recorded equal luminance value, the recorded equal luminance values of the neighboring rows and merging into one sub-block the adjacent detected longest lines with the same recorded equal luminance values.

The rightmost start position (RSP) and the leftmost end position (LEP) of the horizontal rows are recorded as the new start and end positions of the merged sub-block, separately. The largest sub-block in the current block is the merged sub-block with the maximum number of pixels. On FIG. 2, the detected sub-block is therefore the sub-block B2 comprising grey pixels. Indeed, the sub-block B1 comprises less pixels. If both have same number of pixels we can choose to keep the first detected one.

Figure 2:
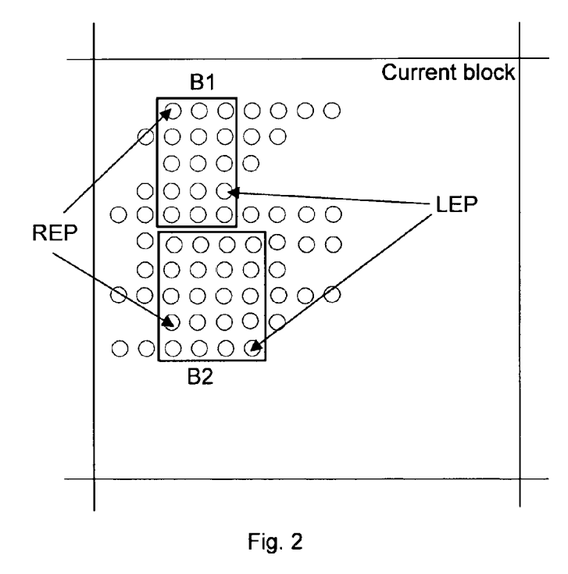
FIG. 2 illustrates sub-blocks of a current block whose pixels have an equal luminance value.

According to a variant, vertical rows and longest columns are considered instead of horizontal rows and longest lines.

At step 12, the detected largest sub-block is identified as a natural texture or a non natural texture. When a deblocking filter is applied (such as for images encoded according to H.264 using default deblocking filter or for images encoded according to MPEG2 with a de-blocking filter applied as post-processing), the detected largest sub-block is identified as a natural texture when the detected largest sub-block reaches at least two opposite block borders of the current block (e.g. top and bottom borders and/or left and right borders) and as a non natural texture otherwise.

When no deblocking filter is applied (such as for images encoded according to MPEG2 or for images encoded according to H.264 with deblocking filter disabled, or for the images for which no information is provided on if deblocking filter is applied or not, i.e. when we do not know if a deblocking filter is or is not used) the detected largest sub-block is identified as a natural texture when the detected largest sub-block exceeds at least two opposite block borders of the current block (e.g. top and bottom borders and/or left and right borders) and as a non natural texture otherwise. Here 'exceeds' means that the largest sub-block not only reaches the borders of the current block, but also has the same luminance value with at least one line of pixels of the neighboring blocks next to the borders.

At step 14, a weighted luminance difference d between the detected equal sub-block and its neighboring pixels is computed. Several luminance masking methods can be used for this purpose. As an example, for 8-bit grey-scale images, d may be computed as follows: $d = w \times (|\mu_e - \mu_n|)$, where $\mu_e$ is the average luminance of the detected largest sub-block, $\mu_n$ is the average luminance of neighboring pixels, separately and w is a weight related to texture and luminance masking. w can be calculated as follows:

$$w = \begin{cases} \lambda \ln\left(1 + \dfrac{\sqrt{\mu_n}}{1+\sigma_n}\right), & \text{if } \mu \leq \zeta \\ \lambda \ln\left(1 + \dfrac{\sqrt{255-\mu_n}}{1+\sigma_n}\right) & \text{otherwise} \end{cases}$$

where:
- $\zeta$ is the selected average luminance value for which the highest weight should be given to the blockiness;
- $\lambda$ is a parameter related to $\zeta$; and
- $\mu_n$ and $\sigma_n$ are the average luminance and standard deviation of the neighboring pixels.

Users can optionally set the value of $\zeta$ in the range from 70 to 90. Default value is 81. $\lambda$ can be calculated as follows:

$$\lambda = \frac{\ln(1+\sqrt{255-\zeta})}{\ln(1+\sqrt{\zeta})}$$

$\mu_n$ and $\sigma_n$ s can be calculated as explained below.

Figure 3:
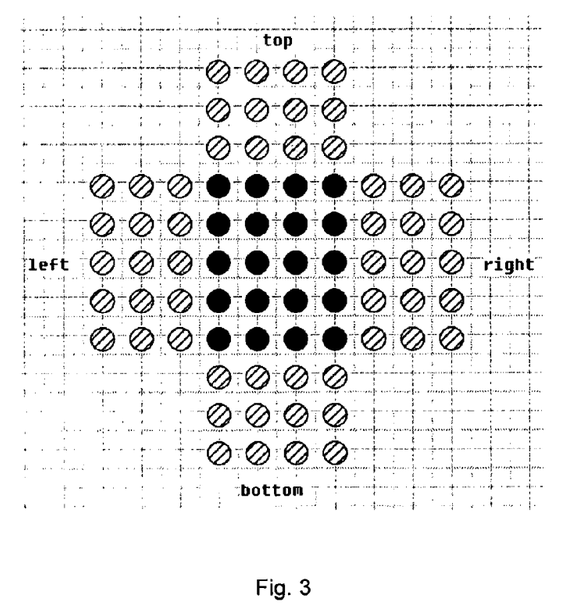
FIG. 3 illustrates a sub-block of a block whose pixels have an equal luminance value and neighboring pixels.

Firstly, the neighboring pixels are defined. As shown in FIG. 3, after detected the largest sub-block, e.g. the 4×5 block of black pixels on FIG. 3, neighboring pixels are defined for example as three lines of pixels to the left, right, top, and bottom. The neighboring pixels may be defined differently, for example as 4 lines of pixels instead of 3.

Secondly, the average luminance and standard deviation in the 4 neighboring blocks are calculated separately. They are referred as $\mu_{left}$, $\mu_{right}$, $\mu_{top}$, $\mu_{bottom}$, and $\sigma_{left}$, $\sigma_{right}$, $\sigma_{top}$, $\sigma_{bottom}$ respectively. As an example, $\mu_{left}$ and $\sigma_{left}$ are calculated as follows:

$$\begin{cases} \mu_{left} = \sum_{i=1}^{N_{left}} p_i / N_{left} \\ \sigma_{left} = \sqrt{\sum_{i=1}^{N_{left}} (p_i - \mu_{left})^2 / (N_{left} - 1)} \end{cases}$$

where $N_{left}$ is the number of pixels in the left neighboring block and $p_i$ is the luminance value of the $i^{th}$ pixel. $\mu_{right}$, $\mu_{top}$, $\mu_{bottom}$, and $\sigma_{right}$, $\sigma_{top}$, $\sigma_{bottom}$ can be calculated in the same way. Finally, the overall average luminance value $\mu_n$ and standard deviation $\sigma_n$ of the neighboring pixels are calculated as follows:

$$\begin{cases} \mu_n = (\mu_{left} + \mu_{right} + \mu_{top} + \mu_{bottom})/4 \\ \sigma_n = (\sigma_{left} + \sigma_{right} + \sigma_{top} + \sigma_{bottom})/4 \end{cases}$$

At step 16, a block blockiness level is determined for the current block. The step 16 is detailed on FIG. 4.

Figure 4:
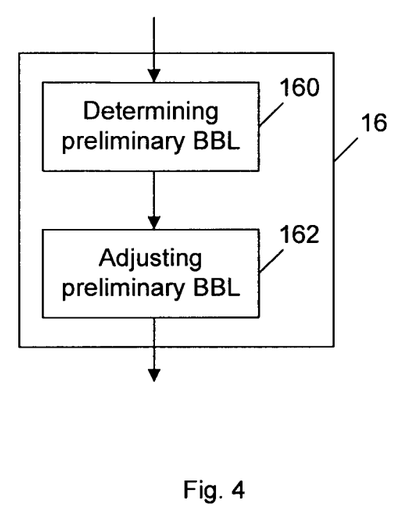
FIG. 4 illustrates one of the step of the processing method according to the invention.

At step 160, a preliminary block blockiness level BBL is calculated for the current block on the basis of the number of pixels within the detected largest sub-block and on the basis of the results of the identification step 12. As an example, preliminary block blockiness level BBL is calculated as follows:

$$BBL = \begin{cases} 0 & \text{when the detected largest subblock is a natural texture} \\ 1 & \text{when } T2 \leq N \\ N/T2 & \text{when } T1 \leq N < T2 \\ 0 & \text{when } N < T1 \end{cases}$$

where T1 and T2 are threshold values and N is the number of pixels within the detected largest sub-block. The default value of $(T_1, T_2)$ is (30, 80). For the images with very complicated texture, T1 and T2 can be adjusted a little lower, but not lower than (20, 70). For the images with large plain texture, they can be adjusted a little higher, but not higher than (50, 100). The case $N<T_1$ refers to the case where the size of the detected largest sub-block is small. In this case the block blockiness level is set to zero.

Another example to calculate the preliminary block blockiness level BBL is as below:

$$BBL = \begin{cases} 0 & \text{when the detected largest subblock is a natural texture} \\ 1 & \text{when } T2 \leq N \\ 0.5 & \text{when } T1 \leq N < T2 \\ 0 & \text{when } N < T1 \end{cases}$$

where T1 and T2 are threshold values and N is the number of pixels within the detected largest sub-block. The thresholds (T1, T2) can be set in the same way as in the above example. According to other embodiments, it can set more thresholds to divide the block blockiness level into finer granularity. At step 162, the preliminary block blockiness level BBL is adjusted depending on a blockiness sensitivity on the basis of the weighted luminance difference computed at step 14. Such blockiness sensitivity may be user defined based on application requirements. As an example, 5 levels of blockiness sensitivity are defined as follows:

most sensitive level L5:

$$B_{L5} = BBL$$

L5 is mainly used in applications dealing with high quality videos.

Intermediate sensitive level L4:

$$B_{L4} = \begin{cases} BBL & 1 \leq d \\ d \times BBL & 0.5 \leq d < 1 \\ 0 & d < 0.5 \end{cases}$$

Intermediate sensitive level L3:

$$B_{L3} = \begin{cases} BBL & 2 \leq d \\ (d-1) \times BBL & 1 \leq d < 2 \\ 0 & d < 1 \end{cases}$$

Intermediate sensitive level L2:

$$B_{L2} = \begin{cases} BBL & 4 \leq d \\ \frac{(d-2)}{2} \times BBL & 2 \leq d < 4 \\ 0 & d < 2 \end{cases}$$

Least sensitive level L1:

$$B_{L1} = \begin{cases} BBL^* & 4 \leq d \\ \frac{(d-2)}{2} \times BBL^* & 2 \leq d < 4 \\ 0 & d < 2 \end{cases}$$

$$BBL^* = \begin{cases} 0 & \text{texture cases} \\ 1 & T_2 \leq N_b \\ N_b/T_2 & T_1 \leq N_b < T_2 \\ 0 & N_b < T_1 \end{cases}$$

where the thresholds of $(T_1, T_2)$ are set as (50, 100), i.e. to their upper values. Apart from the value of (T1, T2), BBL* is not different from BBL.

L1 is mainly used in applications dealing with low quality videos.

L5 is used for generating high quality videos. It marks all the possible blockiness areas even though the blockiness can only be noticed by very careful checking. Therefore, even for such areas, where the blockiness can only be noticed by very careful checking, the value $B_{L5}$ is different from 0. The blockiness may be ignored in some conditions (such as displayed in low quality display equipment), but only if it is possible to be noticed, it will be marked out. L4-L2 levels have intermediate sensitivity between L5 and L1. Content creator can optionally select them for different quality requirements. L1 is used for generating low quality videos, such as some videos shared in internet. It only marks the areas with very strong blockiness that may influence the video quality very much. There may be some areas with noticeable blockiness but not marked out, i.e. with $B_{L1}=0$, if the blockiness does not influence the video quality very much.

According to a variant, only a subset of the above blockiness sensitivity levels is defined. According to another variant, more blockiness sensitivity levels are defined.

If all blocks of the image have been considered then the method continues to step 20, otherwise the next block in the image is considered as the new current block and the method goes back to step 10.

At step 20, the image is processed on the basis of the block blockiness levels computed at step 16. According to an advantageous embodiment, the image is filtered on a block basis, the blocks having a high blockiness level being filtered more strongly than the block having a low blockiness level. According to a variant, the image is encoded with encoding parameters adapted on the basis of the blockiness level. As an example, the quantization parameter is adapted on a block level. To get a stable quality, the blocks having a high blockiness level are encoded with a lower quantization parameter than the blocks having a low blockiness level. According to another embodiment the image is distributed over a channel. Knowing the image quality in the user end thanks to the block blockiness level, the video distributor adjusts the image coding parameters (e.g. quantization parameter, deblocking filter parameters) and possibly the channel bandwidth on the basis of these block blockiness levels. In addition, the distributors can charge differently the end user according to the received video quality level evaluated by the block blockiness levels or by a video blockiness level. Advantageously, the video blockiness level is determined on the basis of the block blockiness levels determined for the blocks of all the images of the video. As an example, the video blockiness level is determined as the average of these block blockiness levels BBL. According to a variant, the video blockiness level VBL is determined as a function of these block blockiness levels BBL considering spatial and temporal masking.

Figure 5:
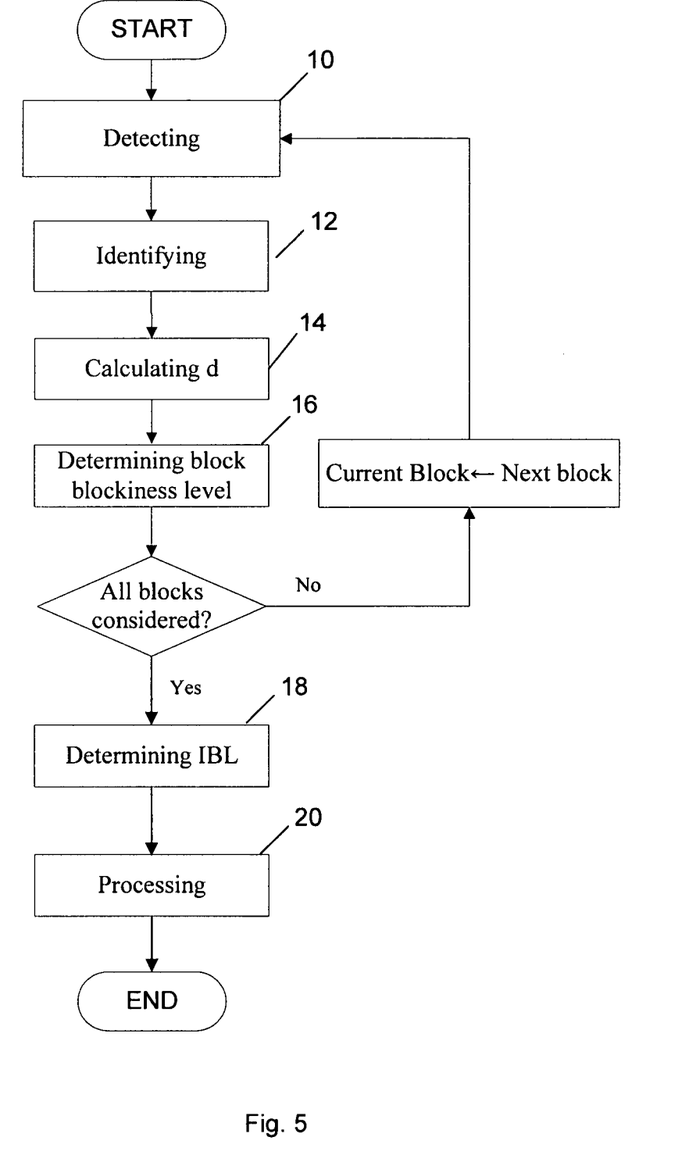
FIG. 5 illustrates a processing method according to another embodiment of the invention.

According to another embodiment illustrated on FIG. 5, an image blockiness level IBL is determined at step 18 on the basis of the block blockiness levels. As an example, the image blockiness level is determined as the average of the block blockiness levels. According to a variant, the image blockiness level IBL is determined as the sum of the weighted block blockiness levels. The weight of block is determined based on the region of interest ROI information. The block located in the region with higher interest has higher weight than the block located in the region with lower interest. The image is thus processed at step 20 on the basis of this image blockiness level IBL.

Figure 1:
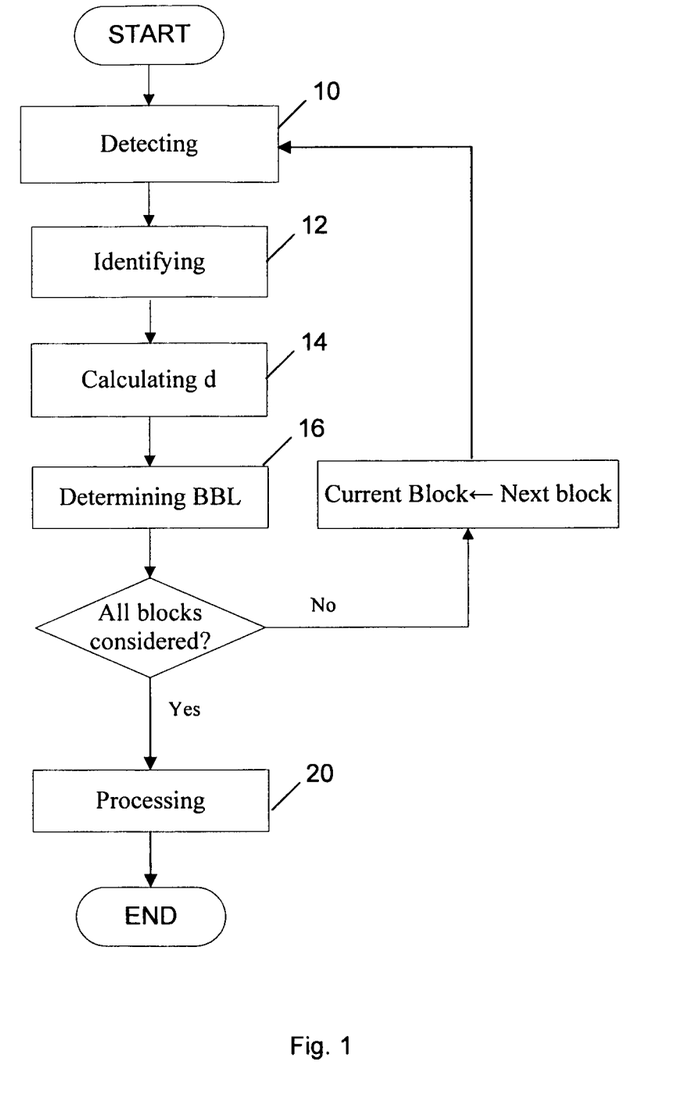
FIG. 1 illustrates a processing method according to a first embodiment of the invention.

According to another variant, the method of processing illustrated on FIGS. 1 and 4 further comprises a step 19 of computing a blockiness map from the block blockiness levels computed at step 16. Block blockiness levels are first scaled to (0, 255) as follows:

Scaled Blockiness=$B_{Li}\times 255$, $i=(1,2,3,4,5)$ where $B_{Li}$ is the blockiness of level $L_i$.

The blockiness map is a 8-bit grey-scale picture with corresponding block pixels value set as the scaled blockiness. In the blockiness map the size of the corresponding block may be scaled, i.e., if the block size for blockiness calculation is 16×16, the size of the corresponding block in blockiness map may be 16×16, 4×4, 32×32, . . . .

Figure 6:
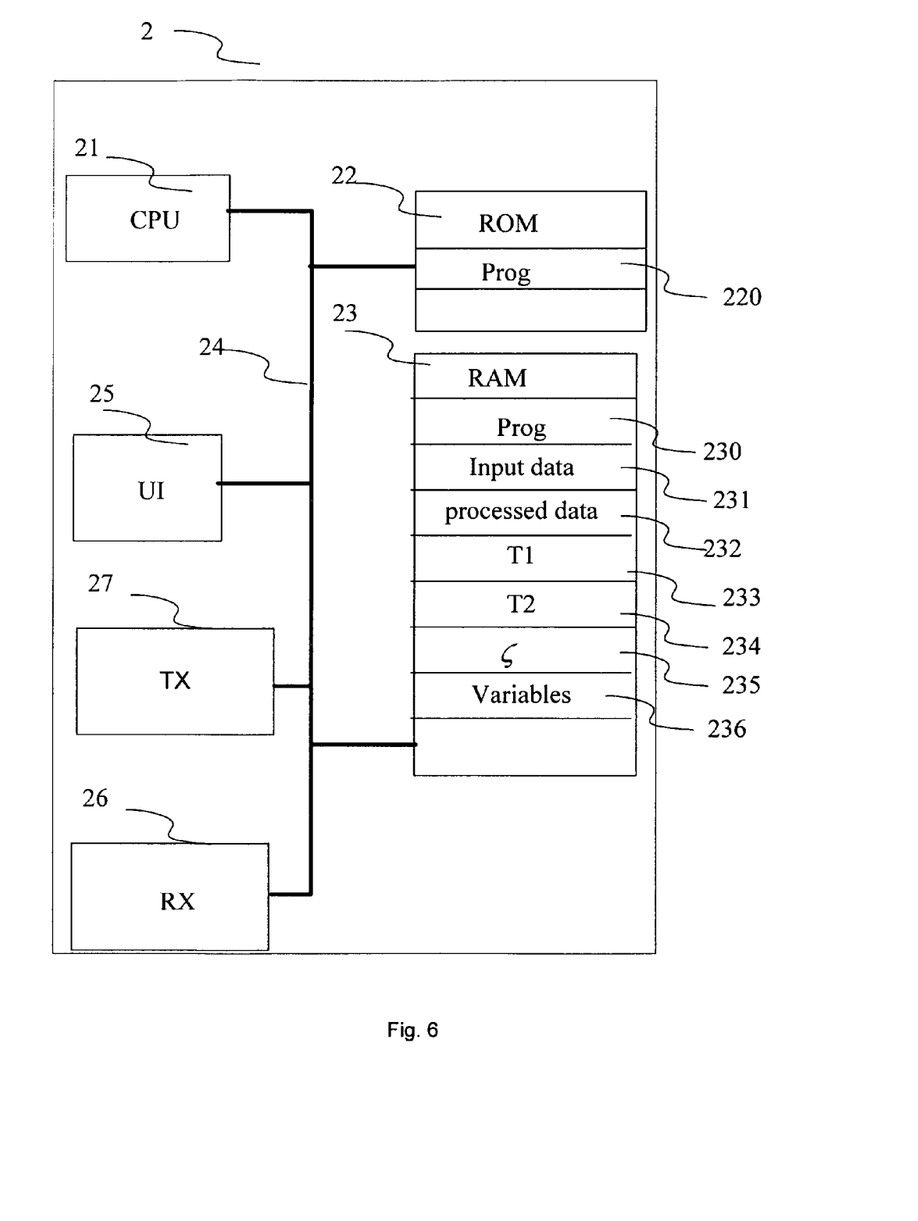
FIG. 6 illustrates a processing device according to the invention.

FIG. 6 represents an exemplary architecture of an image processing device 2 according to the invention. The processing device 2 comprises following elements that are linked together by a data and address bus 24:

- a microprocessor 21 (or CPU), which is, for example, a DSP (or Digital Signal Processor);
- a ROM (or Read Only Memory) 22;
- a RAM (or Random Access Memory) 23;
- a user interface 25;
- a reception module 26 for reception of images;
- possibly a module 27 for transmission of processed images (i.e. the output of the processing method) to an application and/or a display.

Each of these elements of FIG. 3 are well known by those skilled in the art and won't be disclosed further. In each of mentioned memory, the word <<register>> used in the specification can correspond to area of small capacity (some bits) or to very large area (e.g. a whole program or large amount of received or decoded data). ROM 22 comprises a program "prog" 220. Algorithms of the processing method according to the invention are stored in the ROM 22. When switched on, the CPU 21 uploads the program 220 in the RAM and executes the corresponding instructions. RAM 23 comprises:

- in a register 230, the program executed by the CPU 21 and uploaded after switch on of the processing device 2;
- input data in a register 231;
- processed data in different state of the processing method in a register 232;
- T1 and T2 in registers 233 and 234 respectively;
- ζ in register 235; and
- other variables used for processing the image in a register 236 (e.g. filter parameters encoding parameters, and/or monitoring parameters, etc).

According to a variant of the invention, the digital part of the processing device 2 is implemented in pure hardware configuration (e.g. in one or several FPGA, ASIC or VLSI with corresponding memory) or in a configuration using both VLSI and DSP.

The invention claimed is:

1. A method for processing an image divided into blocks of pixels, the method comprising:

detecting, for each block, a largest sub-block whose pixels have an equal luminance value; and, identifying, for each block, if the detected largest sub-block is or is not a natural texture;

calculating, for each block, a weighted luminance difference between the detected largest sub-block and neighboring pixels;

determining, for each block, a block blockiness level on the basis of the number of pixels within the detected largest sub-block determined by said identifying and said weighted luminance difference; and processing said image on the basis of said block blockiness levels.

2. The method according to claim 1, said method further comprising determining an image blockiness level for said image by averaging the block blockiness levels and wherein said image is processed on the basis of said image blockiness level.

3. The method according to claim 1, wherein said processing comprises one of:

encoding said image;

filtering said image; and distributing said image.

4. The method according to claim 1, wherein, when a deblocking filter is applied on said image, identifying the detected largest sub-block as natural texture when the detected largest sub-block reaches at least two opposite block borders.

5. The method according to claim 1, wherein, when no deblocking filter is applied on said image or when no information is provided on applying or not applying a deblocking filter, identifying the detected largest sub-block as natural texture when the detected largest sub-block exceeds at least two opposite block borders.

6. The method according to claim 1, wherein the determining a block blockiness level comprises:

determining a preliminary block blockiness level on the basis of the number of pixels within the detected largest sub-block and on the basis of the results of the identification step; and adjusting said preliminary block blockiness level as a function of the weighted luminance difference, said function depending on a blockiness sensitivity.

7. The method according to claim 6, wherein the preliminary block blockiness level BBL for a block is calculated as follows:

$$BBL = \begin{cases} 0 & \text{when the detected largest subblock is natural texture} \\ 1 & \text{when } T2 \leq N \\ N/T2 & \text{when } T1 \leq N < T2 \\ 0 & \text{when } N < T1 \end{cases}$$

where T1 and T2 are threshold values and N is the number of pixels within the detected largest sub-block.

8. The method according to claim 6, wherein the preliminary block blockiness level BBL for a block is calculated as follows:

$$BBL = \begin{cases} 0 & \text{when the detected largest subblock is a natural texture} \\ 1 & \text{when } T2 \leq N \\ 0.5 & \text{when } T1 \leq N < T2 \\ 0 & \text{when } N < T1 \end{cases}$$

where T1 and T2 are threshold values and N is the number of pixels within the detected largest sub-block.

9. An apparatus configured to process an image divided into blocks of pixels, the apparatus comprising:
a memory; and
a processor configured to:
  detect, for each block, a largest sub-block whose pixels have an equal luminance value; and,
  identify, for each block, whether the detected largest sub-block is a natural texture;
  calculate, for each block, a weighted luminance difference between the detected largest sub-block and neighboring pixels;
  determine, for each block, a block blockiness level based on a number of pixels within the detected largest sub-block and said weighted luminance difference; and
  process said image based on said block blockiness levels.

10. The apparatus according to claim 9, wherein the processor is further configured to determine an image blockiness level for said image by averaging the block blockiness levels and wherein said image is processed based on said image blockiness level.

11. The apparatus according to claim 9, wherein to process said image the processor is configured to encode said image, filter said image, or distribute said image.

12. The apparatus according to claim 9, wherein, when a deblocking filter is applied on said image, the processor is configured to identify the detected largest sub-block as natural texture when the detected largest sub-block reaches at least two opposite block borders.

13. The apparatus according to claim 9, wherein, when no deblocking filter is applied on said image or when no information is provided on applying or not applying a deblocking filter, the processor is configured to identify the detected largest sub-block as natural texture when the detected largest sub-block exceeds at least two opposite block borders.

14. The apparatus according to claim 9, wherein to determine a block blockiness level, the processor is configured to:
  determine a preliminary block blockiness level based on the number of pixels within the detected largest sub-block and whether the detected largest sub-block is the natural texture; and
  adjust said preliminary block blockiness level as a function of the weighted luminance difference, said function depending on a blockiness sensitivity.

15. The apparatus according to claim 14, wherein the preliminary block blockiness level (BBL) for a block is calculated as follows:

$$BBL = \begin{cases} 0 & \text{when the detected largest sub-block is a natural texture} \\ 1 & \text{when } T2 \leq N \\ N/T2 & \text{when } T1 \leq N < T2 \\ 0 & \text{when } N < T1 \end{cases}$$

where T1 and T2 are threshold values and N is the number of pixels within the detected largest sub-block.

16. The apparatus according to claim 14, wherein the preliminary block blockiness level (BBL) for a block is calculated as follows:

$$BL = \begin{cases} 0 & \text{when the detected largest sub-block is a natural texture} \\ 1 & \text{when } T2 \leq N \\ 0.5 & \text{when } T1 \leq N < T2 \\ 0 & \text{when } N < T1 \end{cases}$$

where T1 and T2 are threshold values and N is the number of pixels within the detected largest sub-block.

* * * * *